UNITED STATES PATENT OFFICE.

FRANK CANDY, OF BEXLEY, ASSIGNOR TO THE INTERNATIONAL WATER AND SEWAGE PURIFICATION COMPANY, LIMITED, OF WESTMINSTER, ENGLAND.

PROCESS OF PREPARING IRON ORE FOR FILTERS.

SPECIFICATION forming part of Letters Patent No. 440,539, dated November 11, 1890.

Application filed June 12, 1890. Serial No. 355,241. (No specimens.) Patented in England February 6, 1886, No. 1,793; in France September 3, 1886, No. 165,555, and in Belgium November 9, 1886, No. 75,169.

*To all whom it may concern:*

Be it known that I, FRANK CANDY, of Bexley, England, a subject of the Queen of Great Britain, have invented an Improved Filtering Material for use in the Purification of Liquids and Gases, (for which I have received Letters Patent in Great Britain, No. 1,793, dated February 6, 1886; in France, No. 165,555, dated September 3, 1886, and in Belgium, No. 75,169, dated November 9, 1886;) and I do hereby declare that the following is a full, clear, and exact description of the invention, which will enable others skilled in the art to which it appertains to make and use the same.

My invention consists in an improved process for treating carbonate of iron for filtering purposes; and it consists in the steps hereinafter set forth.

According to my said invention I take the iron-stone and I place it in a suitable vessel or retort or revolving chamber and heat the vessel or retort or revolving chamber without allowing free access of air to the interior thereof, and when vapor ceases to pass off from the iron-stone and the gases have been nearly or quite driven off I close the vent of the said vessel or retort or revolving chamber and cool the contents or allow the contents to cool. When the material thus treated is cool or has cooled below redness, the manufacture is completed, and I then disintegrate it to the required size if it has not already been broken or granulated. I find it convenient to draw the material when red hot into an iron tank, and during the process of drawing or removing it from the retorts I sprinkle it with water and then quickly cover the tank with a suitable cover and seal it down with a mixture of fire-clay and lime to exclude the air, and when the tank is cool I remove the contents for granulating to the required size.

The iron-stone which I use is an argillaceous carbonate of iron commonly known as "clay iron-stone." I have used with advantage those kinds of argillaceous carbonate of iron or clay iron-stone which are found in the anthracite and some other coal measures, including the black-band iron-stone. The clay or shale or rock which adheres to the iron-stone on the outer portion, should be separated from the iron-stone before treating it as herein described. This may be done by mechanical means or by "weathering."

Before placing the iron-stone in the vessel or retort in which it is to be subjected to heat I reduce it to such a size as will admit of the apparatus selected for use being conveniently charged. The amount or degree of heat to which the iron-stone is subjected must be sufficient to produce carbonization, but must not be sufficient to produce fusion or reduction. The kind of retorts or other carbonizing apparatus employed may be such as are ordinarily used in destructive-distillation processes, provided they admit of the iron-stone being maintained at a bright-red heat for a sufficient length of time to effect the necessary porosity and carbonization and that they do not admit of access of air to the matter under treatment to such an extent as to produce appreciable oxidation. Any slight accidental access of air due to slight leakage of the joints of the apparatus—such as may be caused by contraction and expansion—is not objectionable; but access of air should be avoided as far as practicable. An apparatus such as is used for the revivification of animal charcoal may be employed for the purpose.

When ordinary carbonizing apparatus is used, it is desirable that the vents of the apparatus, which are provided for the escape of vapor and gases from the matter under treatment while it is being heated, should be closed just before or as soon as the gases have ceased to pass off from the iron-stone. The carbonized matter when properly prepared will be black, or nearly so. Redness or yellowness of the said matter is an indication that it has become oxidized to some extent, and this it is important to avoid. The time for closing the vents of the apparatus may be ascertained by igniting the gas issuing therefrom and watching the flame, the flickering of which indicates the time when the vents should be closed.

The cooling of the iron-stone after carbonization must be conducted with the same care as the cooling of animal charcoal after the process of carbonization or revivification in order to prevent oxidation. In using revolving cylinders the operation of carbonizing the iron-stone is the same as in the case of animal charcoal.

The iron-stone prepared as hereinbefore described has great oxidizing power, and is valuable for use in the purification of water and other liquids, and of gases.

Where the iron-stone has not been broken to the size required for use before carbonizing it, I further break it or granulate it to the required size after it has been carbonized and cooled.

Having now particularly described and ascertained the nature of my invention and in what manner the same is to be performed, I would observe that I am aware that it has been proposed to prepare a material for use in the purification of liquids by mixing carbonate of iron with carbonaceous matter and carbonizing the mixture, and I wish it to be understood that I make no claim to the carbonization of carbonate of iron when in artificial admixture with any organic or other matter, the object of my invention being to produce a material which will be free from the objections which attend the use of such carbonized mixtures, the principal of which objections is that the added matters are liable to impart color, odor, and flavor to water treated with such carbonized mixtures; but

What I claim as my said invention, and desire to secure by Letters Patent of the United States of America, is—

The process of treating argillaceous carbonate of iron for filtering purposes, which consists in subjecting it in a closed retort to a carbonizing but not a fusing heat, gradually cooling the same, and finally pulverizing it to the proper size, substantially as set forth.

FRANK CANDY.

Witnesses:
WILLIAM THOMAS WHITEMAN,
JOHN ALFRED DONNISON.